United States Patent [19]

Bzdak

[11] Patent Number: 4,803,588

[45] Date of Patent: Feb. 7, 1989

[54] SURGE ARRESTER

[75] Inventor: Richard J. Bzdak, Allegany, N.Y.

[73] Assignee: Cooper Industries, Inc., Houston, Tex.

[21] Appl. No.: 852,004

[22] Filed: Apr. 14, 1986

[51] Int. Cl.[4] .............................................. H02H 3/20

[52] U.S. Cl. ...................................... 361/118; 361/40; 361/58; 361/127

[58] Field of Search ................................ 361/117-119, 361/126, 127, 19, 40, 39, 35, 58; 338/21

[56] References Cited

U.S. PATENT DOCUMENTS 4,527,215 7/1985 Wessing .......................... 361/127 X 4,571,660 2/1986 Mitsumatsu et al. ............... 361/127

*Primary Examiner*—A. D. Pellinen

*Assistant Examiner*—Todd E. De Boer

*Attorney, Agent, or Firm*—Nelson A. Blish; Eddie E. Scott; Alan R. Thiele

[57] ABSTRACT

An underoil surge arrester (10) having metal oxide varistor disks (12) held in place by flexible spring clips (18).

9 Claims, 2 Drawing Sheets

Fig. 1
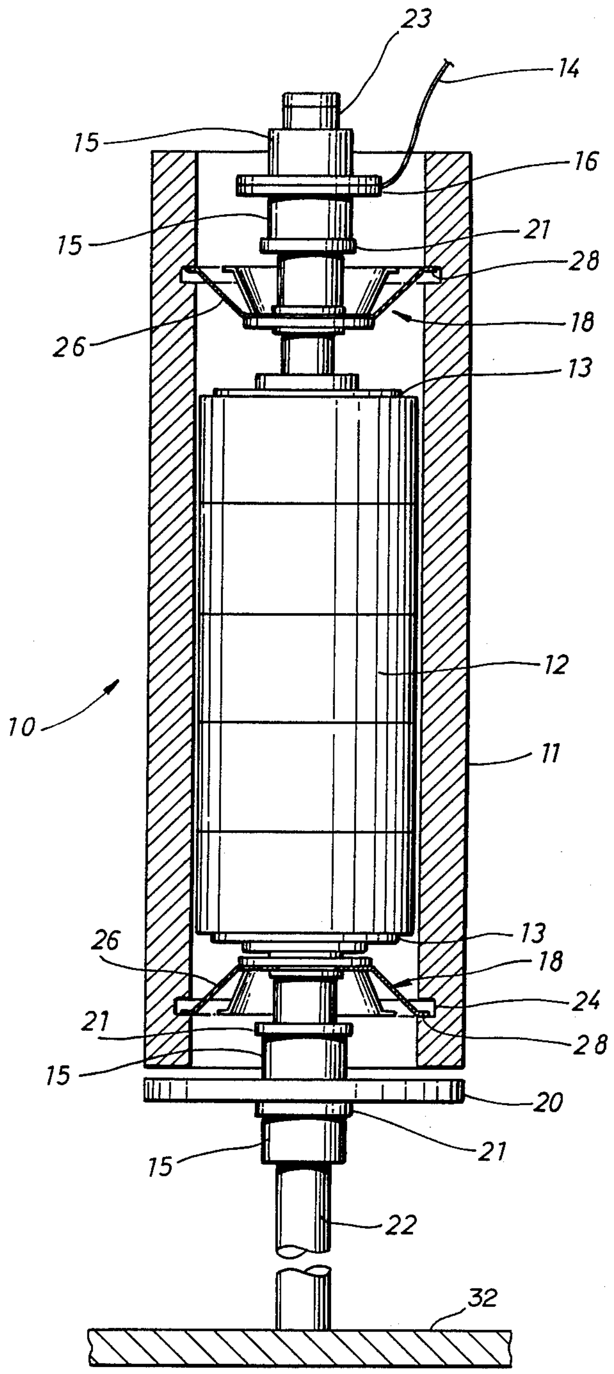
Fig. 2
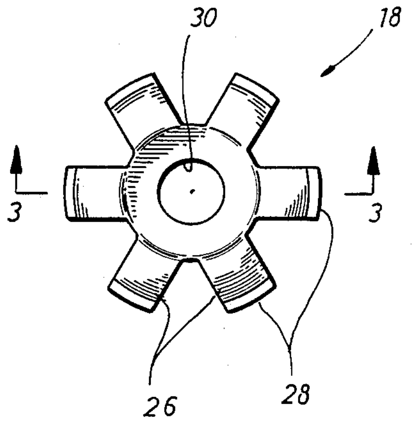
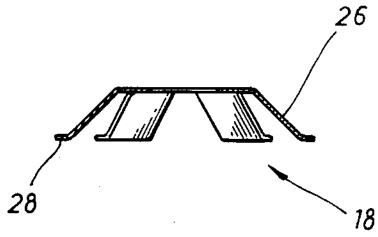
Fig. 3

SURGE ARRESTER

BACKGROUND OF THE INVENTION

1. Field of the Invention

The present invention relates to surge arresters in general and in particular to surge arresters of the metal oxide varistor (MOV) type designed for underoil mounting.

2. Background

It is well known that under normal service conditions the insulation of A.C. and D.C. electric equipment is subject to voltage within a fairly narrow range. However, for a variety of different reasons, such as lightning strike, one or another part of the electric system is liable to undergo a momentary increase in voltage much in excess of that used under normal service conditions, which consequently gives rise to overvoltage phenomena. Should the amplitude of this overvoltage reach a substantial value it may present a hazard to the insulation of the electric installations of stations, substations and power transmission lines. In particular, such overvoltage arising on the power transmission line are capable of damaging the insulation of the most expensive equipment items, i.e. electric machines, transformers, reactors, switching apparatus.

The suppression of the level of overvoltages arising on the power transmission line is accomplished by overvoltage protective devices, such as surge arresters, the application of which has now become virtually indispensable to the operation of high voltage power transmission lines. It should be noted that the operational reliability of electric equipment is largely determined by and dependent on the operational reliability of overvoltage protective devices.

Known in the prior art is an overvoltage protective device (see the U.S. Pat. No. 3,805,114 issued in 1974) comprising a column of non-linear resistors mounted within an insulating housing. Between the non-linear resistors and the inner surface of the insulating housing there is provided a gap. The non-linear resistors are made from zinc oxide-based material.

The non-linear resistors are characterized by a non-linear voltage-current relationship and act as a low resistance to the flow of high-magnitude overvoltage-induced currents, thus limiting the voltage across the terminals of the overvoltage protective device, and as a high resistance under normal service conditions, thus limiting the magnitude of current flowing through the device from the electric network.

Under normal service conditions a minimal current passes through the overvoltage protective device in a continuous manner. Upon the occurrence of overvoltage in the electric network as a result of the high non-linearity inherent in the resistors the passage of large-magnitude overvoltage-induced currents through the overvoltage protective device results in a pronounced increase in voltage at the point of connection of the overvoltage protective device to the electric network. The overvoltage across the equipment connected to the electric network in parallel with the overvoltage protective device is thus limited.

Upon cessation of the overvoltage impact on the electric network a sharp increase in resistance of the non-linear resistors takes place, due to which current through the overvoltage protective device is limited to the magnitude typical for normal service conditions.

Often an overvoltage protection device or arrester is installed adjacent transformer coils. In this configuration it operates in the same environment as a transformer coil, that is, underoil. During an overvoltage condition the arrester conducts current to ground protecting the adjoining transformer coils. In some conditions, the fault current is great enough to cause failure of the arrester. The excess current causes an arc to be generated internally in the arrester which may expel the disks and rupture the arrester housing. A catastrophic failure of an arrester in an oil filled environment is especially violent and may damage the transformer coils it was installed to protect.

In some prior art devices, spring clips were used to hold the disks under constant pressure. During excessive current conditions these springs could be expelled which in turn would short out transformer coils.

It is therefore an object to the present invention to provide an arrester wherein the means for maintaining the MOV disks under constant pressure do not present an electrical hazard under conditions in which they are expelled.

SUMMARY OF THE INVENTION

According to the present invention an underoil surge arrester has a stack of metal oxide varistor blocks housed in an insulating porcelain housing. The MOV blocks are held in place by a concave spring clip at each end of the housing which maintains spring pressure on the MOV blocks. The spring clip has hands which fit into a circumferential groove on the housing maintaining constant pressure on the blocks during normal operation. During an overvoltage condition the pressure in the housing will force the spring clip out of its position in the housing under high-fault current conditions. During normal operation oil can flow freely through openings provided in the spring clip.

BRIEF DESCRIPTION OF THE DRAWINGS

FIG. 1 is a perspective view partially cut away and partially in phantom of a surge arrester according to the present invention.

FIG. 2 is a plan view from the top of a spring clip according to the present invention.

FIG. 3 is a side view of the spring clip shown in FIG. 3.

DETAIL DESCRIPTION OF THE INVENTION

Figure 4:
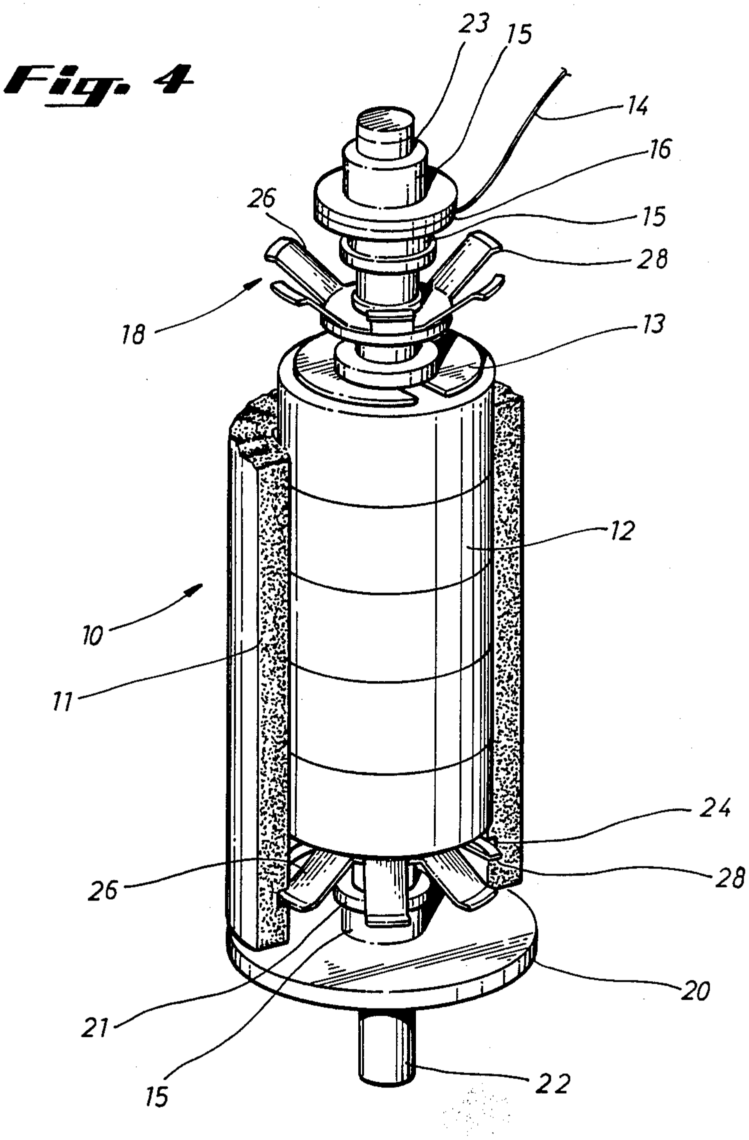
FIG. 4 is a perspective view partially cut away of a surge arrester according to the present invention.

FIG. 1 shows a surge arrester designated generally by numeral 10. The surge arrester is comprised of at least one varistor block. In this preferred embodiment a number of varistor blocks 12 of the metal oxide varistor disk type are used. These blocks or disks are cylindrical and are stacked in a coaxial fashion inside an insulating or porcelain housing 11. Contact plates 13 are used to make electrical contact with the MOV blocks 12. A spring clip 18 is used to maintain a compressive force on the MOV blocks 12. This is accomplished by having the hands shown in FIG. 3 of the spring clip rest on annular grooves 24 in housing 11.

Figure 5:
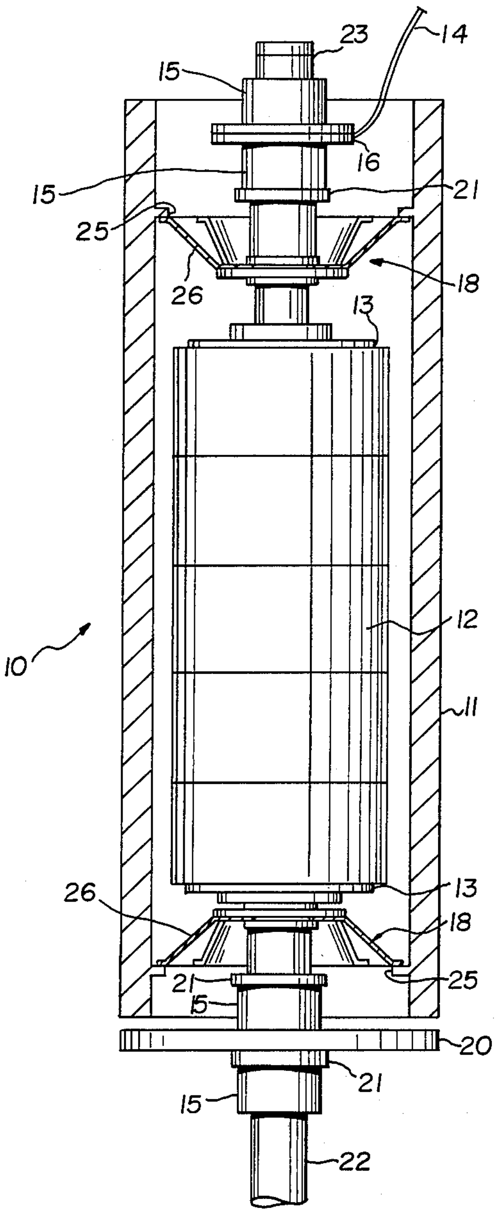
FIG. 5 is a perspective partially cut-away wherein a lip is used as the retaining means for a surge arrester according to the present invention.

Although an annular groove is shown in the preferred embodiment, other retaining means on the housing may be used. For example, a retaining lip 25, shown in FIG. 5, could be used to maintain the hands 28 of spring clip 18 within the housing 11 and maintain pressure on the MOV blocks.

In the preferred embodiment, spring clip 18 is metal and may provide electrical contact between the outside circuitry and the surge arrester. Alternatively, any flexible material, such as plastic for example, can be used for clip 18.

Other standard parts are used in the assembly of the surge arrester in order to facilitate manufacturing. Hex nuts 15, washers 16, 21 and base nut 20 are used to mount the spring clip 18 and contacts 13 to studs 22 and 23. Washers 16 also hold high voltage lead 14, providing an electrical contact between the high voltage side of a transformer coil, not shown, and MOV blocks lower stud 22 is bolted to transformer tank 32 and provides a path to ground for the arrester.

During operation, spring clip 18 maintains a constant pressure on MOV disks 12. Spring clips 18 allow passage of oil between the oil filled exterior environment and the metal oxide varistors 12. During high overvoltage conditions the increased current through the surge arrester causes an overpressure condition and catastrophic failure of the arrester and the concave spring clips are forced 18 outward. The MOV blocks 12 separate from electrical contacts 13 and housing 11 may shatter. The disks 12 and porcelain housing 11 are allowed to fall harmlessly to the bottom of the transformer tank and are nonconductive.

The upper spring clips 18 is attached to high voltage lead 14 which holds spring clip 18 stud 23 and washers 16 and prevents their being lodged in the primary coils of the transformer. Likewise, lower spring clip 18 is held firmly to lower stud 22 which in turn is bolted to the bottom or side of the transformer tank 32. Thus, even though the nonconductive parts of the arresters such as housing 11 and MOV blocks 12 may fall in various places in the interior of the transformer, the conductive portions of the arrester are held firmly in place and are not loose inside the transformer with the possibility of shorting out the transformer coils.

I claim:

1. A surge arrester comprising:
an insulating tubular housing open at one end;
retaining means located within said housing;
at least one varistor block;
a first spring clip having open areas for the free flow of oil, mounted within said housing in electrical contact with one face of said varistor block and in contact with said retaining means to flexibly retain said varistor block in said housing;
a second spring clip having open areas for the free flow of oil, mounted within said housing in electrical contact with the opposite face of said varistor block and in contact with said retaining means to flexibly retain said varistor block in said housing wherein said retaining means is an annular groove in said housing.

2. A surge arrester according to claim 1 wherein said varistor block is a metal oxide varistor disk.

3. A surge arrester according to claim 1 wherein said varistor block is comprised of a plurality of metal oxide varistor disks.

4. A surge arrester according to claim 1 wherein said retaining means is a lip inside said insulating housing.

5. A surge arrester according to claim 1 wherein said spring clip is comprised of a concave flexible metal disk.

6. A surge arrester according to claim 1 wherein said spring clip is comprised of a flat, circular metal plate with arms that reach away from said varistor block in a concave manner.

7. A surge arrester according to claim 6 wherein said arms have hand means for engaging said retaining means.

8. A surge arrester according to claim 1 wherein said first spring clip is attached to a high voltage lead.

9. A surge arrester according to claim 1 wherein said second spring clip is attached to a transformer housing.

* * * * *